US012293242B2

(12) United States Patent
Stanich et al.

(10) Patent No.: US 12,293,242 B2
(45) Date of Patent: May 6, 2025

(54) PRINTER CALIBRATION MECHANISM

(71) Applicants: Mikel Stanich, Boulder, CO (US); Scott R. Johnson, Boulder, CO (US); Walter F. Kailey, Boulder, CO (US); William Manchester, Boulder, CO (US); Pallavi Premkumar, Boulder, CO (US)

(72) Inventors: Mikel Stanich, Boulder, CO (US); Scott R. Johnson, Boulder, CO (US); Walter F. Kailey, Boulder, CO (US); William Manchester, Boulder, CO (US); Pallavi Premkumar, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/476,566

(22) Filed: Sep. 28, 2023

(65) Prior Publication Data
US 2025/0111184 A1    Apr. 3, 2025

(51) Int. Cl.
G06K 15/02 (2006.01)
G06F 3/12 (2006.01)
G06K 15/10 (2006.01)

(52) U.S. Cl.
CPC ......... *G06K 15/027* (2013.01); *G06F 3/1204* (2013.01); *G06F 3/1286* (2013.01); *G06K 15/102* (2013.01); *G06K 15/1822* (2013.01); *G06K 15/1881* (2013.01)

(58) Field of Classification Search
CPC ............... G06K 15/027; G06K 15/102; G06K 15/1822; G06K 15/1881; G06F 3/1204; G06F 3/1286
See application file for complete search history.

(56) References Cited

U.S. PATENT DOCUMENTS

| 4,436,439 A | 3/1984 | Koto |
| 6,154,227 A | 11/2000 | Lund |
| 6,290,321 B1 | 9/2001 | Murray |

(Continued)

FOREIGN PATENT DOCUMENTS

| JP | 4470500 B2 | 6/2010 |
| JP | 4834387 B2 | 12/2011 |

(Continued)

OTHER PUBLICATIONS

Notice of Allowance for U.S. Appl. No. 18/182,932, mailed Nov. 2, 2023, 9 pages.

(Continued)

*Primary Examiner* — Akwasi M Sarpong
*Assistant Examiner* — Michael L Burleson
(74) *Attorney, Agent, or Firm* — Jaffery Watson Hamilton & DeSanctis LLP

(57) ABSTRACT

A printing system is disclosed. The printing system includes at least one physical memory device to store calibration logic and one or more processors coupled with the at least one physical memory device to execute the calibration logic to receive a first printer transfer function, receive a first print substrate transfer function associated with a first print substrate and generate a composite transfer function based on a function composition operation of the first print substrate transfer function and the first printer transfer function.

20 Claims, 15 Drawing Sheets

(56) References Cited

U.S. PATENT DOCUMENTS

| | | |
|---|---|---|
| 6,641,053 B1 | 11/2003 | Breidenbach |
| 7,110,144 B2 | 9/2006 | Cheng |
| 7,986,447 B2 | 7/2011 | Bang et al. |
| 8,049,939 B2 | 11/2011 | Wilms et al. |
| 8,322,811 B2 | 12/2012 | Chandu et al. |
| 8,368,779 B2 | 2/2013 | Manabe |
| 8,454,116 B2 | 6/2013 | Asauchi |
| 8,594,383 B2 | 11/2013 | Nachlieli |
| 8,705,130 B2 | 4/2014 | Miyazaki |
| 8,755,083 B2 | 6/2014 | Kawamoto |
| 9,010,893 B1 | 4/2015 | Mizes |
| 9,070,076 B1 | 6/2015 | Smith |
| 9,170,543 B2 | 10/2015 | Arakawa |
| 9,641,700 B2 | 5/2017 | Schumann |
| 9,641,726 B1 | 5/2017 | Schweid |
| 9,767,546 B2 | 9/2017 | Kojima |
| 10,038,824 B1 | 7/2018 | Das |
| 10,214,038 B2 | 2/2019 | Klinger |
| 10,489,091 B2 | 4/2019 | Tsukamoto |
| 10,303,099 B2 | 5/2019 | Chiyoda |
| 10,324,406 B2 | 6/2019 | Endoh |
| 10,449,759 B2 | 10/2019 | Trachanas |
| 10,500,849 B1 | 12/2019 | Ernst |
| 10,878,300 B2 | 7/2020 | Chen |
| 10,906,326 B2 | 2/2021 | Hauck |
| 10,981,376 B2 | 4/2021 | Kamada |
| 11,126,125 B1 | 9/2021 | Lin |
| 11,216,710 B1 | 1/2022 | Stanich et al. |
| 11,283,936 B1 | 3/2022 | Stanich |
| 11,368,592 B1 | 6/2022 | Kailey |
| 11,443,152 B1 | 9/2022 | Stanich et al. |
| 11,481,162 B1 | 10/2022 | Rao et al. |
| 11,503,171 B2 | 11/2022 | Kurohata |
| 11,632,487 B1 | 4/2023 | Terrab |
| 11,922,241 B1* | 3/2024 | Stanich ............... B41J 2/04586 |
| 2005/0122361 A1 | 6/2005 | Huang |
| 2008/0151276 A1* | 6/2008 | Mori .................... H04N 1/6019 |
| | | 358/1.9 |
| 2012/0300232 A1 | 11/2012 | Kouguchi |
| 2014/0316841 A1 | 10/2014 | Kilby |
| 2015/0298153 A1 | 10/2015 | Baker |
| 2015/0356381 A1* | 12/2015 | Choulet ............... H04N 1/6033 |
| | | 358/1.9 |
| 2015/0373305 A1 | 12/2015 | Hauf |
| 2021/0268805 A1* | 9/2021 | Stanich ............... G06K 15/027 |
| 2021/0278791 A1 | 9/2021 | Yoshioka |
| 2022/0088922 A1 | 3/2022 | Gracia Verdugo |
| 2022/0294932 A1 | 9/2022 | Morales |
| 2022/0366555 A1 | 11/2022 | Kashibuchi |

FOREIGN PATENT DOCUMENTS

| | | |
|---|---|---|
| JP | 5157753 | 3/2013 |
| JP | 5413432 | 2/2014 |
| JP | 5780052 B2 | 9/2015 |
| JP | 6036307 B2 | 11/2016 |
| JP | 6171730 B2 | 8/2017 |
| JP | 6286921 | 3/2018 |
| JP | 6340920 B2 | 6/2018 |
| JP | 6477076 B2 | 3/2019 |
| JP | 6489433 B2 | 3/2019 |
| JP | 6521664 | 5/2019 |
| JP | 6590047 B2 | 10/2019 |
| JP | 6606913 B2 | 11/2019 |
| JP | 6642167 B2 | 2/2020 |
| JP | 6716979 B2 | 7/2020 |
| JP | 6746545 B2 | 8/2020 |
| JP | 6764867 | 10/2020 |
| JP | 6908189 | 7/2021 |
| JP | 2021140045 A | 9/2021 |
| JP | 2021150771 A | 9/2021 |
| JP | 2021173953 A | 11/2021 |
| JP | 6992401 | 1/2022 |
| JP | 7059857 | 4/2022 |
| JP | 7089593 B2 | 6/2022 |
| JP | 7109316 | 7/2022 |
| JP | 7110582 B2 | 8/2022 |
| JP | 7110726 B2 | 8/2022 |
| JP | 7146302 B2 | 10/2022 |
| JP | 2022174395 A | 11/2022 |
| JP | 7211221 B2 | 1/2023 |
| JP | 7253390 B2 | 4/2023 |
| JP | 7187077 B1 | 6/2023 |
| JP | 2020082738 A | 9/2023 |
| WO | 2012027100 A1 | 3/2012 |

OTHER PUBLICATIONS

Study on Modulation Transfer Function and Optical Characteristics of Printing Paper, downloaded from https://ieeexplore.ieee.org/document/4723285, published Dec. 22, 2008, 3 pages.

Office Action for U.S. Appl. No. 18/182,932, mailed Sep. 14, 2023, 7 pages.

Notice of Allowance for U.S. Appl. No. 18/182,932, mailed Nov. 2, 2023, 10 pages.

* cited by examiner

PRINTER CALIBRATION MECHANISM

FIELD OF THE INVENTION

The invention relates to the field of image reproduction, and in particular, to printer calibration.

BACKGROUND

Entities with substantial printing demands typically implement a high-speed production printer for volume printing (e.g., one hundred pages per minute or more). Production printers may include continuous-forms printers that print on a web of print media (or paper) stored on a large roll. A production printer typically includes a localized print controller that controls the overall operation of the printing system, and a one or more print engines that includes one or more printhead assemblies, where each assembly includes a printhead controller and a printhead (or array of printheads). Each printhead contains many nozzles (e.g., inkjet nozzles) for the ejection of ink or any colorant suitable for printing on a medium.

SUMMARY

In one embodiment, a printing system is disclosed. The printing system includes at least one physical memory device to store calibration logic and one or more processors coupled with the at least one physical memory device to execute the calibration logic to receive a first printer transfer function, receive a first print substrate transfer function associated with a first print substrate and generate a composite transfer function based on a function composition operation of the first print substrate transfer function and the first printer transfer function.

BRIEF DESCRIPTION OF THE DRAWINGS

A better understanding of the present invention can be obtained from the following detailed description in conjunction with the following drawings, in which.

DETAILED DESCRIPTION

Optical Density (OD) of production printers changes over time as components experience wear. For example OD increases in an ink jet printer as drop sizes increase due to the wear of printhead components. This change in performance is undesirable because it impacts the consistency of color management. One approach to maintain consistency is to recalibrate primary colors to a specific target OD using a customer's paper. Alternatively, color management profiles (e.g. ICC profiles) may be regenerated to maintain color consistency.

According to one embodiment, a printer calibration mechanism is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
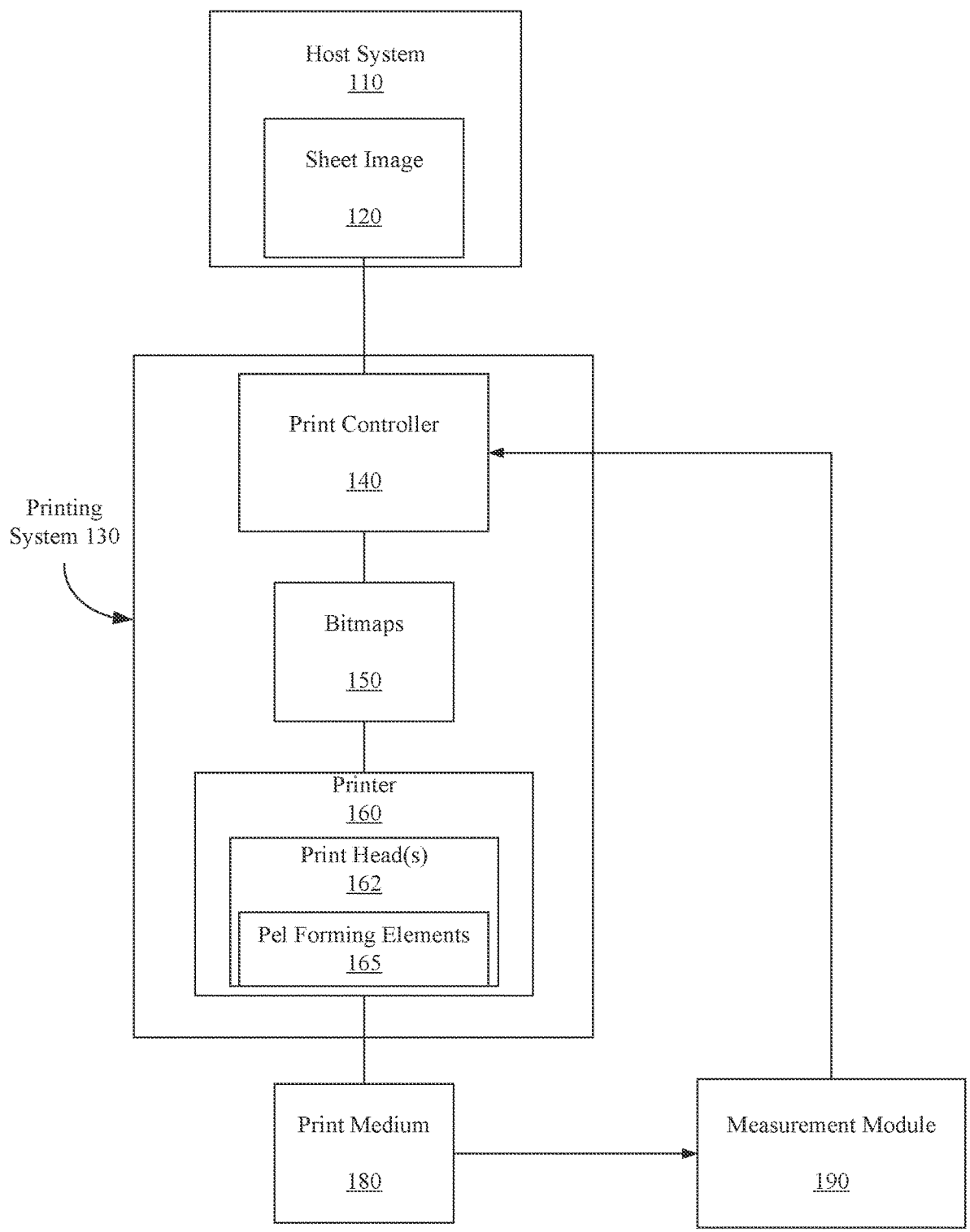
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium (e.g., a print substrate) suitable for printing. The format of print medium 180 may be continuous form or cut sheet or any other format suitable for printing. Printer 160 may be an ink jet, electrophotographic or another suitable printer type.

In one embodiment, printer 160 comprises one or more printheads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser). The pel forming elements may be grouped onto one or more printheads 162. The pel forming elements 165 may be stationary (e.g., as part of a stationary printhead 162) or moving (e.g., as part of a printhead 162 that moves across the print medium 180) as a matter of design choice. The pel forming elements 165 may be assigned to one of one or more color planes that correspond to types of marking materials (e.g., Cyan, Magenta, Yellow, and Black (CMYK)).

In a further embodiment, printer 160 is a multi-pass printer (e.g., dual pass, 3 pass, 4 pass, etc.) wherein multiple sets of pel forming elements 165 print the same region of the print image on the print medium 180. The set of pel forming elements 165 may be located on the same physical structure (e.g., an array of nozzles on an ink jet print head 162) or separate physical structures. The resulting print medium 180 may be printed in color and/or in any of a number of gray shades, including black and white (e.g., Cyan, Magenta, Yellow, and Black, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. The bitmap 150 includes the instructions (e.g., instructed ink drop size and/or instructed pel forming element location) for the one or more printheads 162 and pel forming elements 165. Bitmap 150 may be a halftoned bitmap (e.g., a compensated halftone bit map generated from compensated halftones, or uncompensated halftone bit map generated from uncompensated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a compensation system to obtain measurements of the printed medium 180. The measured results are communicated to print controller 140 to be used in a compensation process. The measurement system may be a stand-alone process or be integrated into the printing system 130.

According to one embodiment, measurement module 190 may be an image sensor to take measurements of printed images on print medium 180. Measurement module 190 may generate and transmit measurement data. Measurement data may be OD (e.g., optical density), perceptual lightness (e.g., L* in the CIELAB color plane L*a*b*) and/or scanned image (e.g., RGB) data corresponding to a printed image. In one embodiment, measurement module 190 may comprise one or more sensors that each or in total take measurements for printed markings produced for some or all pel forming elements 165. In another embodiment, measurement module 190 may be a camera system, in-line scanner, densitometer or spectrophotometer.

Figure 2A:
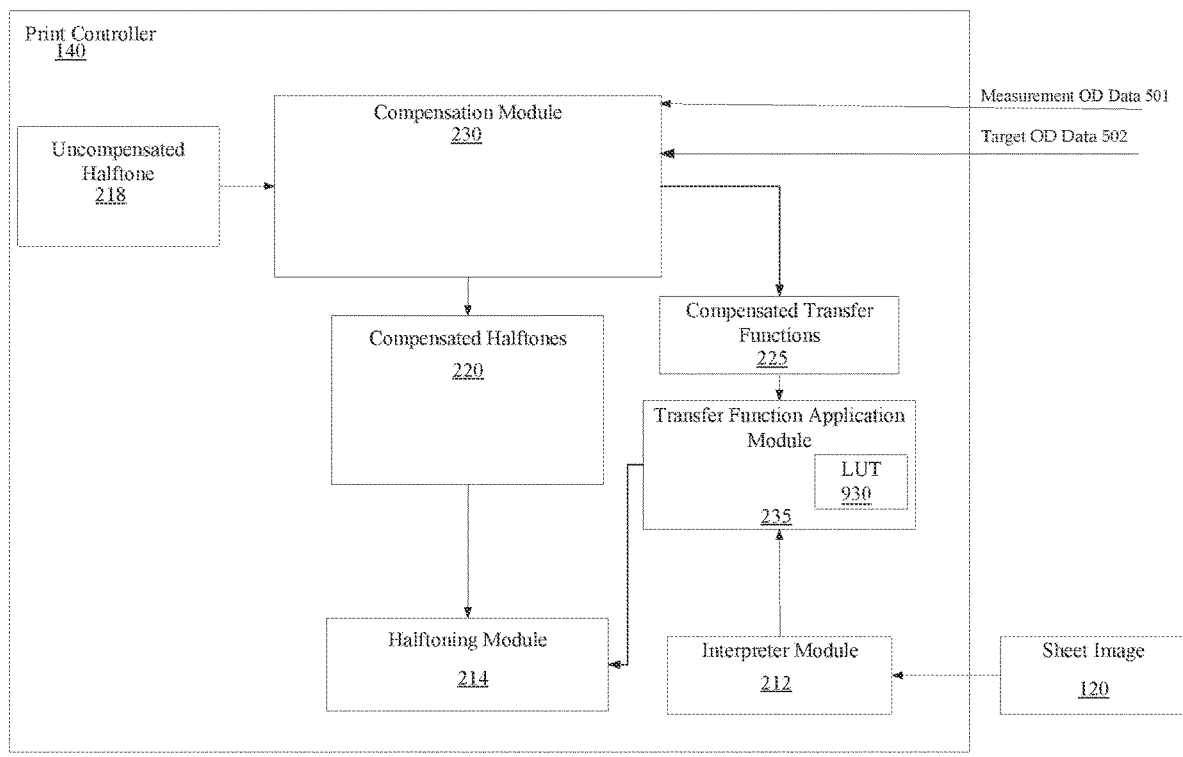
FIGS. 2A & 2B are block diagrams illustrating embodiment of a print controller.
Figure 2B:
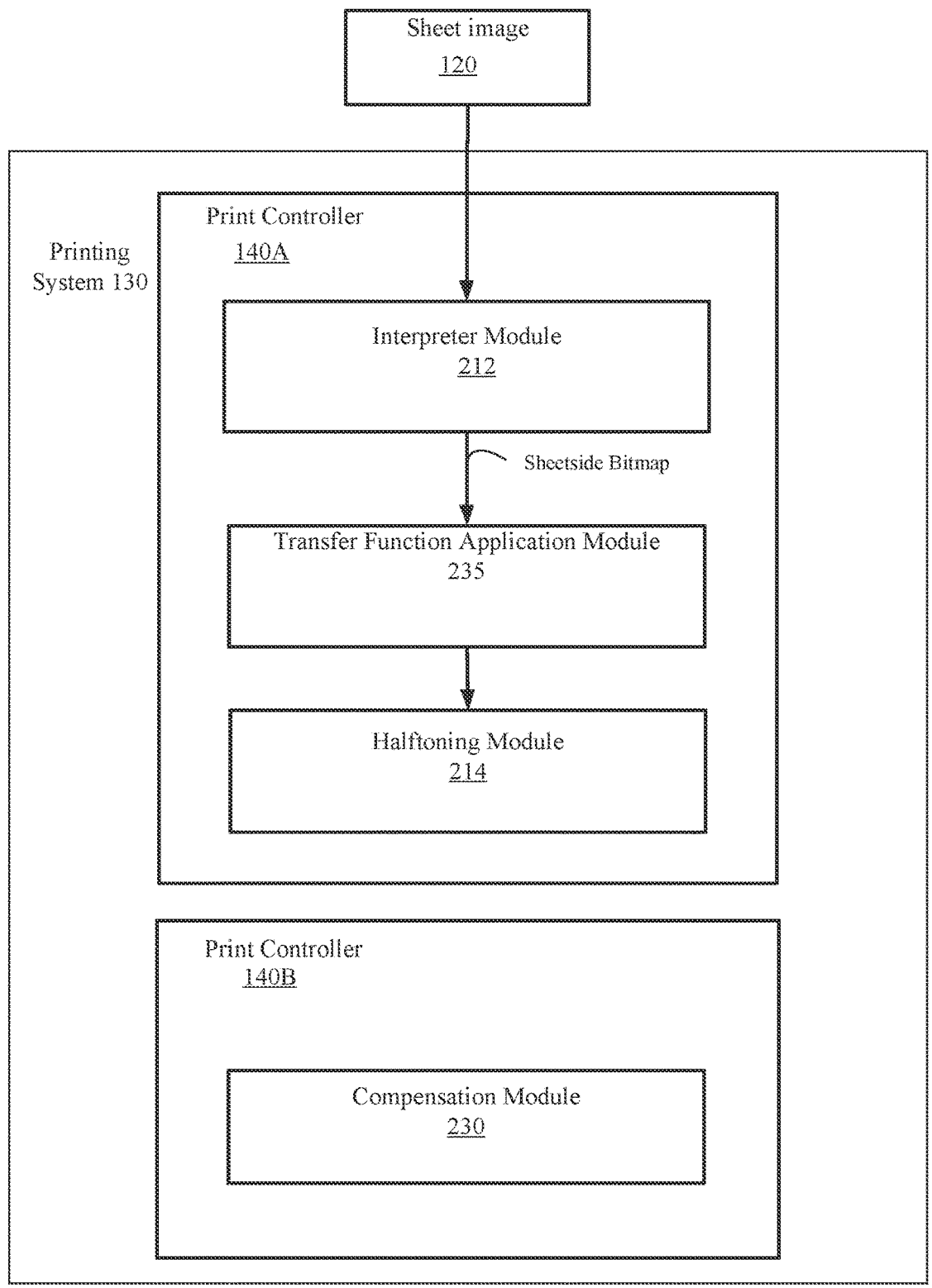

FIG. 2A illustrates a print controller 140 (e.g., DFE or digital front end), in its generalized form, including interpreter module 212, halftoning module 214 and compensation module 230. These separate components may represent hardware used to implement the print controller 140. Alternatively, or additionally, the separate components may represent logical blocks implemented by executing software instructions in a processor of the printer controller 140. FIG. 2B illustrates an alternative embodiment having print controllers 140A & 140B. In this embodiment, print controller 140A includes interpreter module 212 and halftoning module 214, and print controller 140B includes compensation module 230. Print controllers 140A and 140B may be implemented in the same printing system 130 (as shown) or may be implemented separately.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 for each primary color are each a 2-dimensional array of pels representing an image of the print job (e.g., a Continuous Tone Image or CTI), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines. In one embodiment, transfer functions may be implemented by print controller 140 and applied directly to image data as a part of the image processing prior to printing. In that case, the contone image data (e.g., CTI data) is transformed by applying the transfer functions to the CTI data prior to halftoning. A transfer function comprises a mapping of an input digital count to an output digital count for a system, where digital count is the gray level or color value representing the pels in a bitmap 150 (FIG. 1). Transfer functions may be used for calibrating printing system 130.

Halftoning module 214 is operable to represent the sheetside bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes (e.g., instructed ink drop sizes transmitted to printheads) based on pel location.

In one embodiment, the halftone design may include a finite set of transition thresholds between a finite collection of successively larger drop sizes, beginning with zero and ending with a maximum drop size (e.g., zero, small, medium and/or large). The halftone design may be implemented as threshold arrays (e.g., halftone threshold arrays) such as single bit threshold arrays or multibit threshold arrays. In another embodiment, the halftone design may be implemented as a three-dimensional look-up table with all included gray level values.

In a further embodiment, halftoning module 214 performs the multi-bit halftoning using the halftone design including a set of threshold values for each pel in the sheetside bitmap, where there is one threshold for each non-zero ink drop size. The pel is halftoned with the drop size corresponding to threshold values for that pel. The set of thresholds for a halftone design is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the contone levels for each pel in the sheetside bitmap. This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level for a pel. Binary halftoning uses one non-zero drop size plus a zero drop size (e.g., a drop size of none where no ink is ejected). Multi-bit halftoning extends the binary threshold array concept to more than one non-zero drop size.

Multi-bit halftoning may use multiple threshold arrays (e.g., multi-bit threshold arrays), one threshold array for each non-zero drop size. The point operation logic is also extended to a set of greater than, less than or equal to operations to determine the drop size by comparing the threshold or thresholds with image contone data for each pel. Multi-bit defines a power of two set of drop sizes (e.g., two-bit halftone designs have four total drops, including a zero drop size). While power of two may be employed to define the number of drops, systems not following this such as a three total drop system may be used and are still considered multi-bit.

For multi-bit halftones, the MTA is a three-dimensional array including one two-dimensional array for each drop size (e.g., instructed ink drop size) transition. Thus, an MTA includes a set of two-dimensional arrays of thresholds for transition between drop sizes: a first plane (or plane 1) provides the threshold for the Large output level, while a second plane (or plane 2) and third plane (or plane 3) provide thresholds for the Medium and Small output levels respectively for a system having three drop sizes, not including zero drop size (none or Off). In other embodiments, different one-to-one relationship may be used since the correspondence between plane numbers and drop sizes is a matter of design choice.

To use these threshold arrays for halftoning, each multibit threshold array is tiled across the contone image data provided by the sheetside bitmap, which provides a set of threshold values for each pixel in the sheetside bit map. The contone image data (e.g., digital count, gray level data) is logically compared to the threshold data on a pixel basis. In the case of Large drops, they are produced by the halftoning when the image contone data is greater than the respective large threshold values in plane 1.

Medium drops are produced when the image contone data is greater than the medium drop plane 2 thresholds and the image contone data is less than or equal to the large drop thresholds in plane 1. Small drops are produced when the image contone data is greater than the small drop thresholds in plane 3 and the image contone data is less than or equal to the medium drop thresholds in plane 2.

Finally, the off/none drop size occurs for cases when the contone image data is less than or equal to the small drop thresholds in plane 3. In this embodiment of a two-bit multibit printing system, this set of four logical equations, used with thresholds from each plane of the multibit threshold array permit each printing drop size to be defined based on the contone values.

Alternate versions of the halftoning equations may also be defined. An example of an alternate set of halftoning logical expressions replaces the less than or equal to operation with less than and the greater than operation is replaced with greater than or equal too. A further variation uses the less than or equal to and greater than logical expressions starting with the test for the largest drop size first. If a drop size is not found the process continues with the logical expression for the next smallest drop size. If the sequential test for each drop size does not find a drop size, the none drop size is assumed. The threshold arrays for each different set of halftoning equations will vary and therefore the threshold array are generated assuming a given set of equations.

In other embodiments, the number of planes of threshold data can be extended to handle any number of drop sizes. The data of these two-dimensional arrays may be segmented into separate memory regions and stored in any convenient order. For example, the thresholds for each drop size transition may be stored contiguously in memory, and it is often advantageous to do so.

Compensation module 230 performs a compensation process on an un-compensated halftone 218, or previously generated uniformity compensated halftone, received at print controller 140 to generate one or more compensated halftones 220. A compensated halftone is a halftone that has been adjusted to achieve a target output response. Compensated halftones 220 are then received at halftoning module 214 along with the sheetside bitmap. In one embodiment, an un-compensated halftone 218 represents a reference halftone design that is modified to create the compensated halftones based on measurement OD data 501 and target OD data 502. In such an embodiment, measurements of the system response (e.g., measurement optical density (OD) data 501) are received via measurement module 190 using the un-compensated halftone 218 for printing the test chart.

Compensation module 230 may alternatively perform a compensation process to generate compensated transfer functions 225 based on measurement OD data 501 and target OD data 502. The measurement units for OD data 501 having the same units as target OD data 502. In such an embodiment, measurements of the system response (e.g., measurement optical density (OD) data 501) are received via measurement module 190 using compensated halftone 220 for printing the test chart. Compensated transfer functions 225 are then received at transfer function application module 235. Transfer function application module 235 applies the received compensation transfer functions 225 to print image data received from interpreter module 212 prior to performing halftoning at halftoning module 214. In one embodiment, a transfer function comprises a mapping of an input digital count (or tint) to an output digital count for a system, where digital count is the gray level or color value representing the pels in a bitmap 150 (FIG. 1). Transfer functions may be received or generated (e.g., generated based on target OD versus input digital count data and measured OD versus output digital count data).

Compensation module 230 is further implemented to perform a calibration process to maintain optical density (OD) within printer 160 in order to compensate for OD differences from a target OD. According to one embodiment, compensation module 230 receives a first printer transfer function, receives a first print substrate transfer function associated with a first print substrate and generates a first composite transfer function based on a function composition operation of the first print substrate transfer function and the first printer transfer function.

A printer transfer function (e.g., printerTF, a first printer transfer function) is a mapping of an input digital count to an output digital count for a print system to achieve a first target response (e.g., T1, reference ink deposition, Optical Density target) while printing on a first print substrate (e.g., S1 or a reference print substrate) with a first halftone design (e.g., a reference halftone design). When the printer transfer function is applied to the print system, the print system becomes a calibrated print system. A print substrate transfer function (e.g., substrateTF) is a mapping of an input digital count to an output digital count for a calibrated print system to achieve a second target response (e.g., T2) while printing onto a second print substrate (e.g., S2, a customer print substrate) with a first halftone design and the first printer transfer function. A composite transfer function (or CTF) is a transfer function that is the composite of the printer transfer function and the print substrate transfer function, and will be discussed below in more detail.

A calibrated print system is a print system that achieves the first target response while printing onto a first print substrate with a first halftone design and first printer transfer function. M1 is the measured response corresponding to the target print system printing on the first print substrate using the first halftone design and none or an identity transfer function (e.g. digital count output=digital count input). The measurements units for the measured response M1 having the same units as the target response T1. M2 is the measured response corresponding to a calibrated print system printing on the second print substrate using the first halftone design and the first printer transfer function. T2 is the second target response while printing onto a second print substrate with a first halftone design and the first printer transfer function. The measurements units for the measured response M2 having the same units as the target response T2.

A technical benefit of the printer transfer function is that it creates a calibrated print system when the printer transfer function is applied to a print system corresponding to the print system that was the basis for the printer transfer function. A technical benefit of the print substrate transfer function is that when applied to a calibrated print system (e.g., any calibrated print system), it causes the print response to achieve the second target response (e.g., the customer's desired target response) when printing on the second print substrate (e.g., the customer's paper) with the first halftone design and the printer transfer function.

Generating updated printer transfer functions or updated print substrate transfer functions provides technical benefits such as providing control input that may be used by print systems to achieve desired output response targets despite property changes in the print system and print substrate, respectively. Generating the print substrate transfer function for different print substrates (e.g., print substrates having different properties or print substrates having changed properties such as material, mass, thickness or surface treatments) provides technical benefits that include providing control input that may be used by print systems to achieve desired printer output response targets despite the print system switching between printing on different input print substrates. The updated transfer functions are available to be applied to the corresponding print systems with corresponding print substrates.

Figure 3:
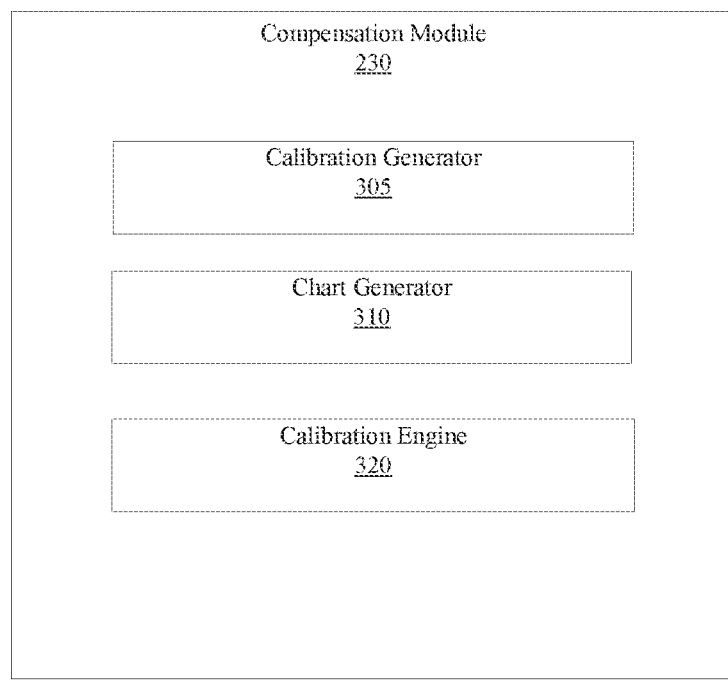
FIG. 3 illustrates one embodiment of compensation module.

FIG. 3 illustrates one embodiment of compensation module 230 including a calibration generator 305, chart generator 310 and calibration engine 320. Calibration generator 305 facilitates a calibration process at print system 130 by directing the calibration process. In one embodiment, the calibration process is performed to generate or update the print system (or printer) transfer function (e.g., for long term printer OD change compensation), the print substrate transfer function and/or the composite transfer function. In such an embodiment, each calibration is based on a calibration performed using a print substrate (e.g., print medium or customer paper) to be implemented to print jobs at printing system 130. In a further embodiment, each calibration may be initiated by a system operator through a user interface in printing system 130.

Chart generator 310 prints a test chart upon initiation of a calibration process. In one embodiment, chart generator 310 generates an image (e.g., print image for the test chart) that is subsequently processed by measurement module 190 to generate OD measurement data. In a further embodiment, first measurement data is generated that is associated with an image printed on paper during a first calibration process using an identity transfer function and an initial print substrate (e.g., a first print substrate). Similarly, second measurement data is generated by printing the image during a subsequent calibration process on a subsequent print substrate (e.g., a second print substrate) using a printer transfer function derived for the first print substrate. Third measurement data is generated by printing the image during a confirmation process on a subsequent print substrate using a printer transfer function and print substrate transfer function associated with that print substrate. In one embodiment, the print substrate used during a subsequent print substrate calibration may be the same or different than the initial print substrate.

Figure 4:
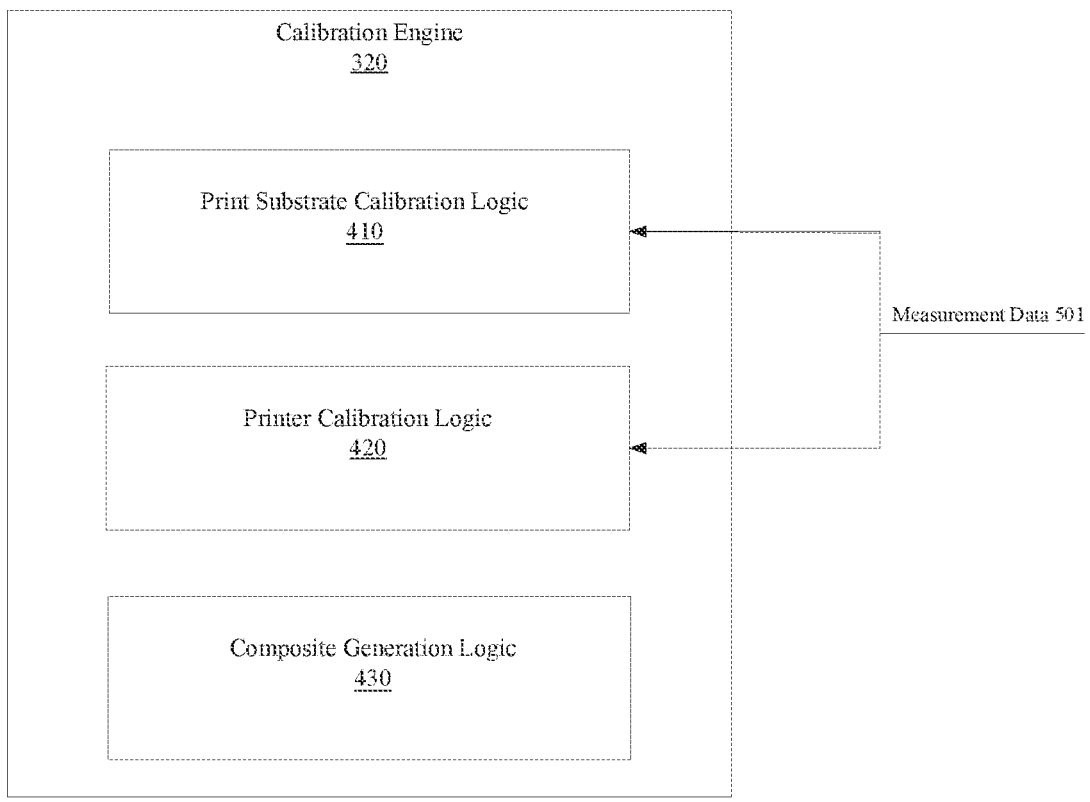
FIG. 4 illustrates one embodiment of calibration engine.

Calibration engine 320 receives the first and second measurement data and generates the printer transfer function and the print substrate transfer functions. The third measurement data may be used to confirm the accuracy of the composite printer transfer function and print substrate transfer function. FIG. 4 illustrates one embodiment of calibration engine 320 including print substrate calibration logic 410, printer calibration logic 420. Both print substrate calibration logic 410 and printer calibration logic 420 receive measurement OD data 501. Composite generation logic is implemented in 430. Print substrate calibration logic 410 may be implemented to generate a print substrate transfer function for each customer paper that is to be used at printing system 130. Printer calibration logic 420 is implemented to generate a printer transfer function. Composite generation logic 430 generates composite transfer functions based on a mathematical function composition of a printer transfer functions and print substrate transfer functions.

In one embodiment, print substrate calibration logic 410 generates updated (or corrected) print substrate transfer functions to compensate for changes to the printer transfer function or changes to print substrate measured responses. In such an embodiment, print substrate calibration logic 410 first generates a first print substrate transfer function based on a current printer transfer function (e.g., PTF_k, where k represents an index of printer transfer functions). Thus, PTF_k, is used to print a test chart on customer paper whose associated measurement data is used to determine a print substrate transfer function (e.g., substrateTF_i_j, where i is an index of different papers and j is index of repeat print substrate transfer functions for the same paper).

In a further embodiment, print substrate calibration logic 410 generates the new print substrate transfer function (e.g., substrateTF_i_j+1) based on the updated printer transfer function (e.g., PTF_k+1). In this embodiment, print substrate calibration logic 410 generates substrateTF_i_j+1 employing measurements using PTF_k+1. The latest versions of PTF and substrateTF are used for printing on the print substrate associated with substrateTF.

Figure 5:
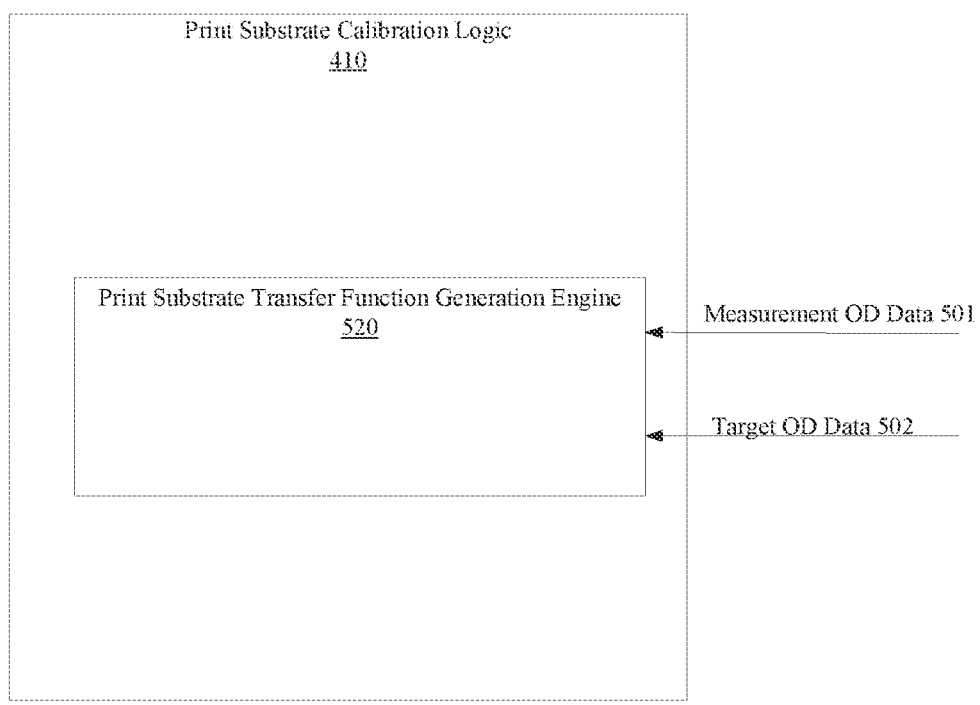
FIG. 5 illustrates one embodiment of print substrate calibration logic.

FIG. 5 illustrates one embodiment of print substrate calibration logic 410. As shown in FIG. 5, print substrate calibration logic 410 includes print substrate transfer function generation engine 520 that receives measurement OD data 501 (associated with printing with a new customer paper and the printer transfer function) from measurement module 190 and target OD data 502. Print substrate calibration logic 410 generates a print substrate transfer function based on the measurement OD data 501 with the printer transfer function used and the target OD data 502.

Figure 6:
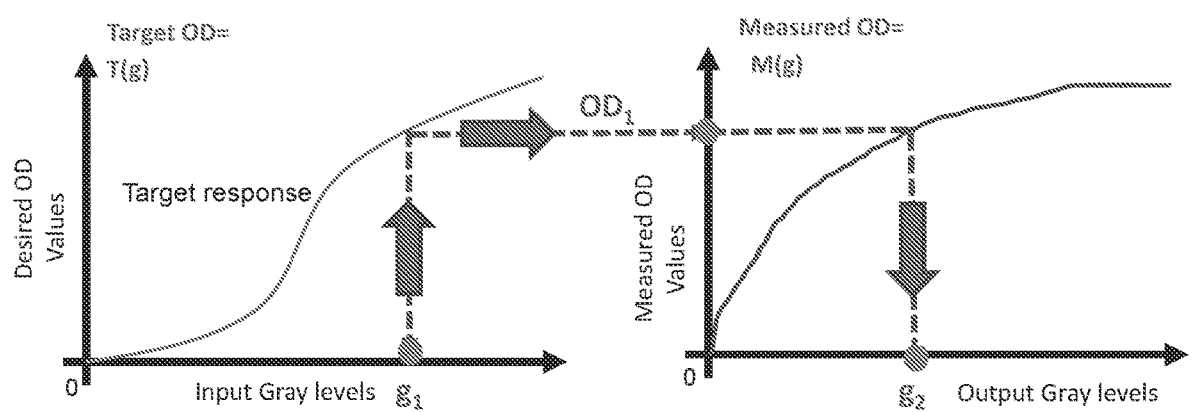
FIG. 6 illustrates one embodiment of a transfer function.

FIG. 6 illustrates one embodiment for generating a transfer function (e.g., a printer transfer function and/or a print substrate transfer function) for all digital count levels (e.g., gray levels). Target OD data T(g) (e.g., target OD data 502) is used as the objective for an applied current halftone with an identity transfer function or current halftone with applied current printer transfer function. The measured response is given by M(g) (e.g., measurement OD data 501). The measured response is determined by printing a single color corresponding to the ink. Given the known response, at gray level $g_1$ the target OD is $OD_1$. To achieve $OD_1$., print level $g_2$ is printed. Using, for example, 0:255 for $g_1$ the set of $g_2$ values defines the transfer function. The transfer function represented as a continuous function defines: g_output=TF (g_input). The expression for the transfer function can be written in terms of the target T and inverse measured responses $M^{-1}$, such that:

$$g\_output = M^{-1}(T(g\_input)) = TF(g\_input)$$

Using g_output values as replacement values for the corresponding g_input values, the calibrated target response is achieved for all levels. The transfer functions may be generated as a lookup table or a mathematical curve. The transfer function curve may be generated though mathematical curve fitting (e.g., using cubic spline, smoothing spline curve or other known mathematical approximation techniques). Transfer function curves may then be evaluated with input values to determine output values by direct computation.

Figure 7:
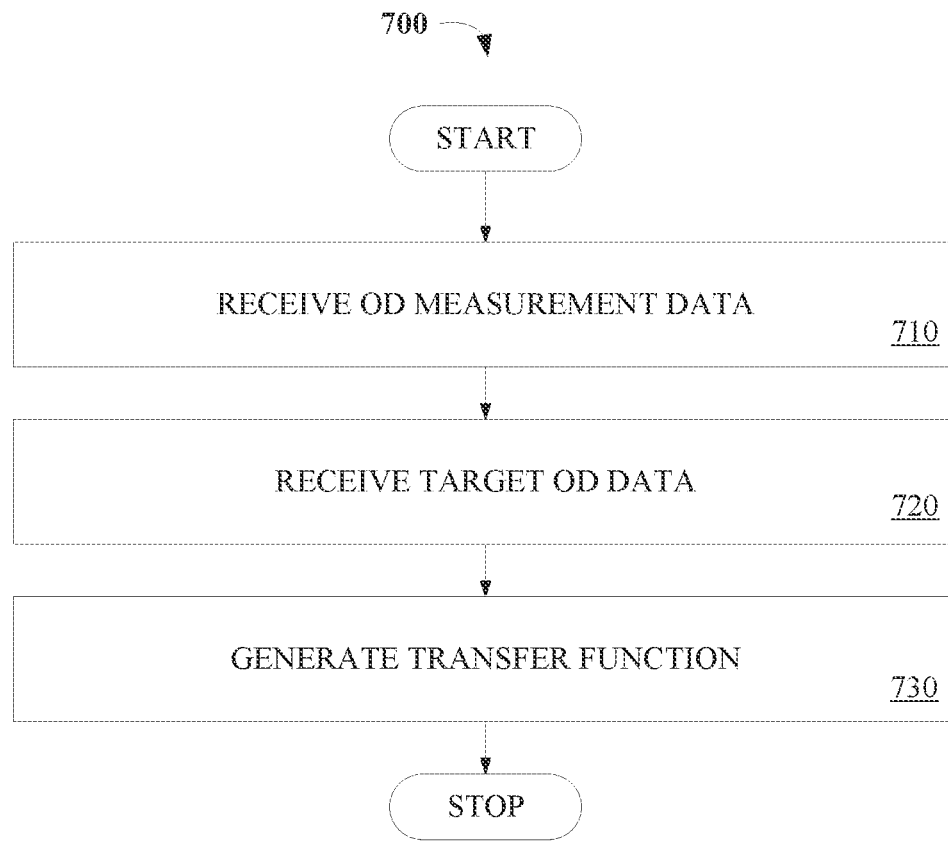
FIG. 7 is a flow diagram illustrating one embodiment of a process for generating a print substrate transfer function.

FIG. 7 is a flow diagram illustrating one embodiment of a process 700 for generating a print substrate transfer function. Process 700 may be performed by processing logic that may include hardware (e.g., circuitry, dedicated logic, programmable logic, microcode, etc.), software such as instructions run on a processing device, or a combination thereof. In one embodiment, process 700 is performed by calibration engine 320.

Process 700 begins at processing block 710, where OD measurement data is received. At processing block 720, target OD data is received. At processing block 730, the transfer function (e.g., printer transfer function or print substrate transfer function) is generated based on the measurement OD data 501 and target OD data 502. In one embodiment, processing block 730 generates print substrate transfer function substrateTF_i_j.

Print substrate transfer function generation engine 520 may also generate print substrate transfer functions associated with a different print substrate (e.g., substrateTF_i+1_j) using new test data for the print substrate according to process 700 using the corresponding measurement OD data 501 and target OD data 502 for the new substrate.

Figure 8:
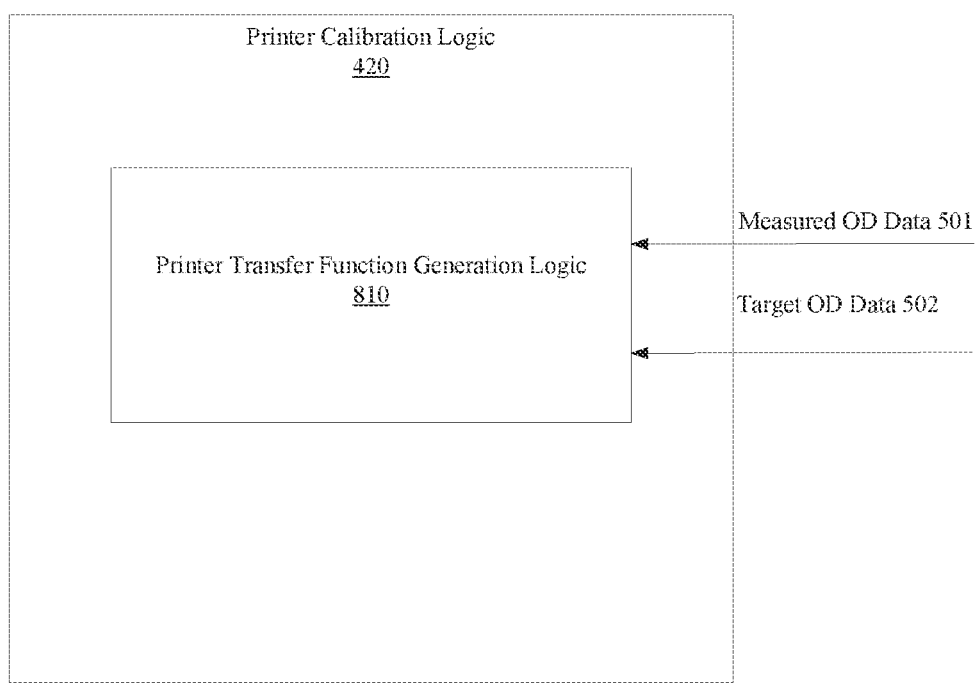
FIG. 8 illustrates one embodiment of printer calibration logic.

Referring back to FIG. 4, printer calibration logic 420 may also generate printer transfer functions. In one embodiment, printer calibration logic 420 generates updated printer transfer functions (PTF_k+1) based on corresponding new measurement OD data 501 that reflects a changed printer response for print system 130. FIG. 8 illustrates one embodiment of printer calibration logic 420. As shown in FIG. 8, printer calibration logic 420 includes printer transfer function generation logic 810 that receives measured OD data 501 and target OD data 502. In one embodiment, printer transfer function generation logic 810 generates a first printer transfer function (PTF_1) for a reference printer calibration paper based on the measured OD data 501 target OD data 502 using measurements from the printed reference printer calibration paper and target OD response for the printer calibration paper without applying a transfer function or with applying an identity transfer function to the CTI data according to process 700. Process 700 begins at processing block 710, where OD measurement data is received. At processing block 720, target OD data is received. At processing block 730, the printer transfer function is generated based on the corresponding measurement OD data 501 and target OD data 502. In one embodiment, processing block 730 generates printer transfer function TF_k. Printer transfer function generation logic 810 may also generate revised printer transfer functions associated with new print system response according to process 700 using the corresponding measurement OD data 501 and target OD data 502 without applying a transfer function or with applying an identity transfer function to the CTI data.

As discussed above, a CTF is a transfer function that is the composite of the printer transfer function and the print substrate transfer function. Referring back to FIG. 4, composite generation logic 430 is implemented to generate composite transfer functions (composite TFs or CTFs). According to one embodiment, the composite transfer function is generated based on evaluating a function composition operation with input digital count values. The composite transfer function may comprise a lookup table or a mathematical curve. A composite transfer function curve may be generated though mathematical curve fitting (e.g., using cubic spline interpolation, smoothing spline curve or other known mathematical approximation techniques). Composite transfer function curves may then be evaluated with input values to determine output values by direct computation. A technical benefit of lookup tables is that evaluating a lookup table has reduced computational processing burden compared to complex runtime calculations associated with evaluating curves.

Figure 9:
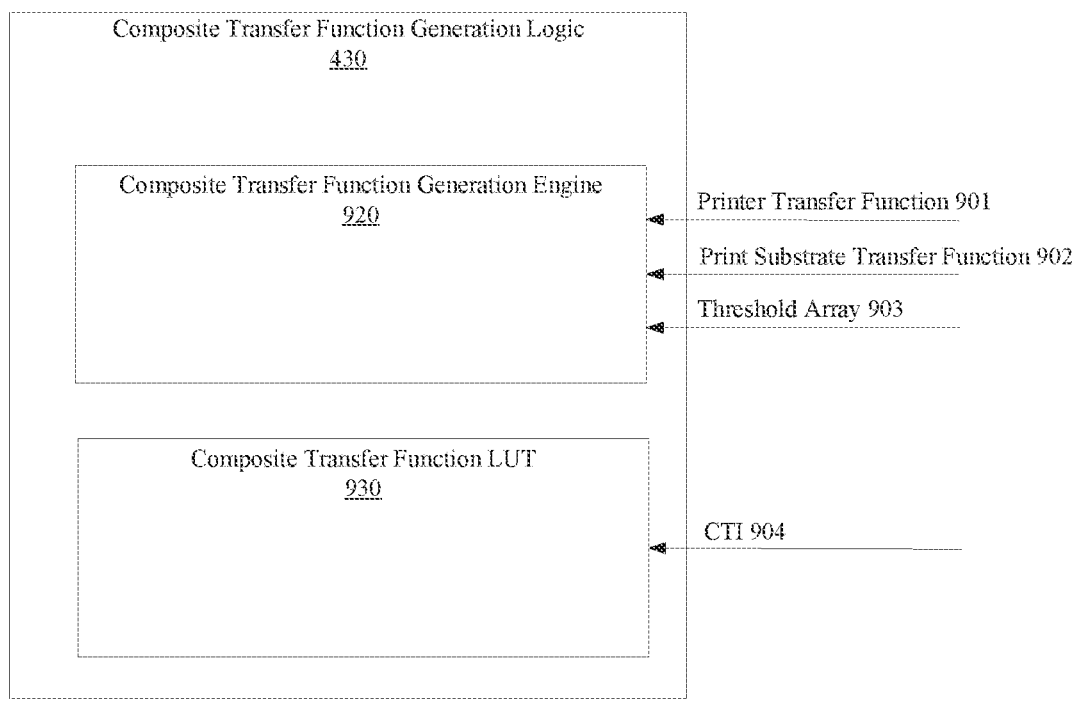
FIG. 9 illustrates one embodiment of composite transfer function generation logic.

FIG. 9 illustrates one embodiment of composite generation logic 430. As shown in FIG. 9, composite generation logic 430 includes composite transfer function generation engine 920 that generates a CTF based on a printer transfer function 901, and a print substrate transfer function 902. In one embodiment, composite transfer function generation engine 920 generates a CTF by defining a printer transfer function 901 having output range values that match the threshold array 903 (e.g., the halftone threshold array or descriptive information about the threshold values for the halftone threshold array corresponding to print system 130) input domain values and generating a CTF output value for each of a plurality of values of printer transfer function 901 based on digital count input values for print substrate transfer function 902. The process of generating a CTF involves creating multiple sets of tuples. Initially using a digital count value related to the contone image data (CTI) each contone image DC level is used as an input to the substrate transfer function generating corresponding output values from the substrate transfer function. This generates a tuple set for the substrate transfer function. The output values for the set of substrate transfer function tuples are used as input values to the printer transfer function generating a second set of tuples related to the printer transfer function. A third set of tuples describing the CTF is formed by the set of input values to the substrate transfer function tuple set as the input CTF tuple values and the set of output values from the printer transfer function forming the output values for the CTF tuple set. This third tuple set is the basis for a CTF look up table or discrete composite transfer function.

In a further embodiment, composite transfer function generation engine 920 generates the CTF by applying the print substrate transfer function as an inner function and applying the printer transfer function as an outer function in the function composition operation.

In one embodiment, the CTF generated at composite transfer function generation engine 920 is represented as:

$$\text{CTF}\_i\_j\,(DC) = printerTF\,(\text{substrateTF}\_i\_j\,(DC)), \text{ or}$$

$$\text{CTF}\_i\_j\,(DC) = (printerTF \circ \text{substrateTF}\_i\_j\,)(DC).$$

Because transfer functions rely on modifications of input levels, this embodiment features print substrate transfer function values 902 being computed prior to computing printer transfer function values 901. Thus, the order of the composition of the transfer functions is important to achieve the correct calibration results.

In one embodiment, the CTF domain, CTF range, halftone threshold values, halftone placeholder values and multibit halftone equations are related. The CTF domain is the set of DC values for an 8-bit imaging system embodiment. DC input values of the CTF are non-negative integers [0,255] or $\{DC \in Z^+ | 0 <= DC <= 255\}$. The CTF also provides a bit depth conversion of the contone image data (typically 8 bit) to the bit depth of the halftoning system, which may be higher (e.g., 14-16 bits). Further, the CTF output range matches the input domain of the halftone thresholds, as defined by the halftone threshold array 903, which is dependent on the specific multibit halftone equations employed.

Assuming pel level multibit halftone equations with four total drop sizes:

Large drop: $DC' > T_{large}$;

Medium drop: $DC' > T_{Medium}$ & $DC' <= T_{large}$;

Small drop: $DC' > T_{Small}$ & $DC' <= T_{large}$; and

None: $DC' <= T_{Small}$,

Where $T_{Large}$, $T_{Medium}$, $T_{small}$ are halftone thresholds corresponding to Large, Medium and Small drop sizes. Where DC' are the values generated by the CTF, which is the input to the halftoning process (DC'=CTF(DC)) and DC are the contone image data input values to the CTF. The halftoning process is employed to convert contone levels to associated drop sizes for each pel of the printed image data.

In one embodiment, the halftone equations are computed in parallel, with only one logical result being true. In such an embodiment, the logical result is used to define the drop size for a pel. In a further embodiment, the CTF range is the set of non-negative integers $[0,(2^{\wedge}bitdepth)-1]$ or $\{DC' \in Z^+ | 0<=DC'<=(2^{\wedge}bitdepth)-1\}$, or alternately a set of non-negative real numbers $\{DC' \in R^+ | 0<=DC'<=(2^{\wedge}Bitdepth)-1\}$. The upper bound of the CTF range depends on the specific halftone equations used and the value of the placeholder threshold.

Further, the domain of thresholds T corresponding to the range of DC' values is represented as:

$$\{T \in Z^+ | 0 <= T <= (2^{\wedge}bitdepth) - 1\}$$

In one embodiment, a threshold value of 0 does not produce a drop, while using negative thresholds produces specific drop sizes. In this case the domain becomes:

$$\{T \in Z | - ((2^{\wedge}bitdepth) - 1) <= T <= (2^{\wedge}bitdepth) - 1\}.$$

A placeholder threshold value that inhibits drops=$(2^{\wedge}Bitdepth)-1$

If printer transfer function 901 and print substrate transfer function 902 are a set of previously defined discrete values having domain and range, the final solution achieves the CTF domain and range described above for those discrete values. In one embodiment, the range of substrateTF_i_j equals the domain of printerTF, and the domain of substrateTF_i_j equals the domain of the CTF and the range of the printerTF equals the range of the CTF, previously described. Based on the above, composite transfer function generation engine 920 generates CTF values via a discrete composite transfer function.

According to one embodiment, an evaluation of the discrete composite transfer function is implemented to generate a composite transfer function lookup table (LUT) 930 representation for the CTFs. In such an embodiment, composite transfer function LUT 930 includes all possible input values defined for CTI 904 and all resulting output values (e.g., CTF values) for each digital count. In a further embodiment, composite transfer function LUT 930 is implemented to transform 8 bit image contone levels received as an input to an output level. In yet a further embodiment, composite transfer function LUT 930 is transmitted to transfer function application module 235 (FIG. 2A) once the discrete composite transfer function evaluation process has been completed. In this embodiment, the transfer function application module 235 applies the received composite transfer function to print image data received from interpreter module 212 prior to performing halftoning at halftoning module 214.

Figure 10:
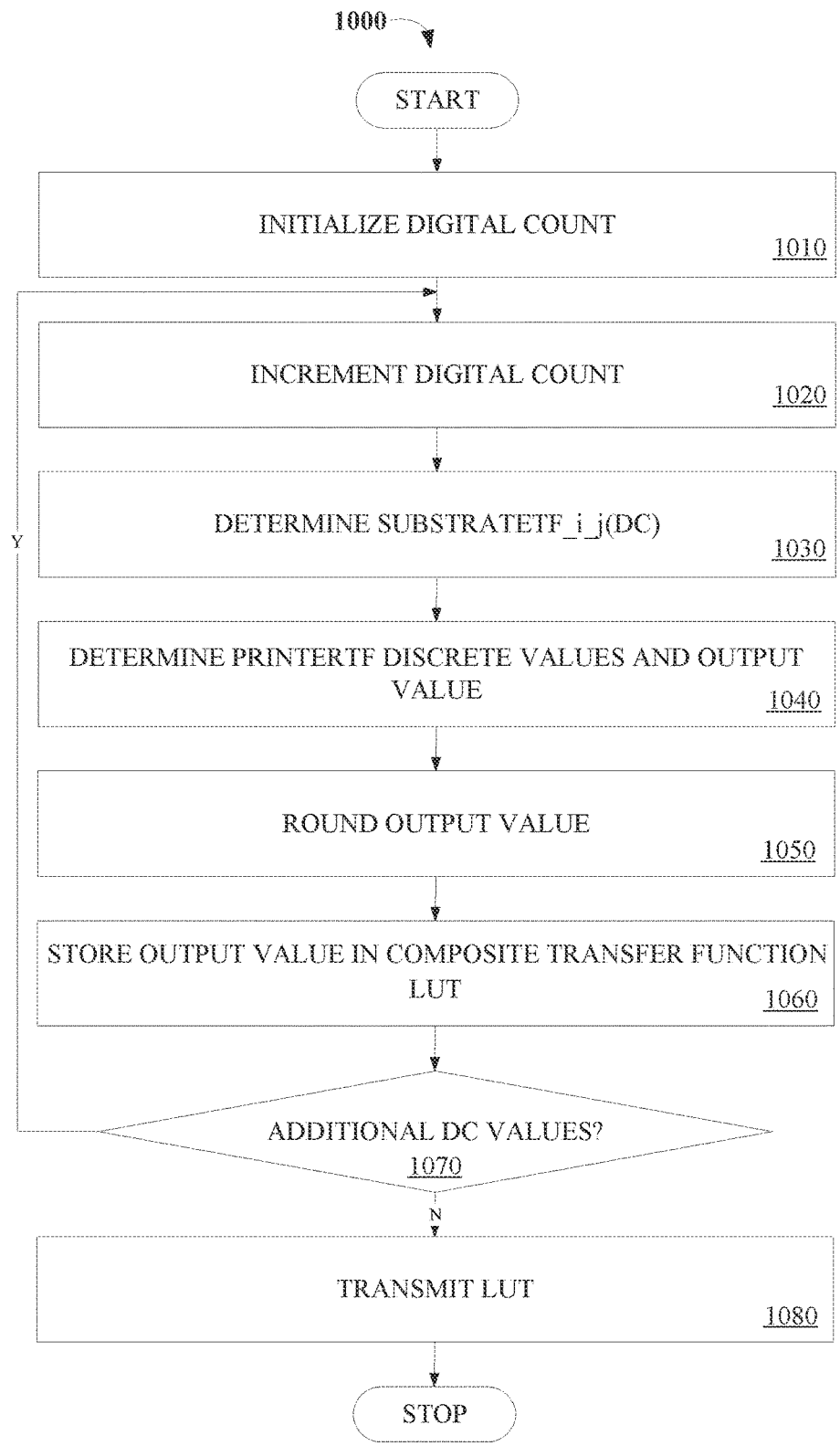
FIG. 10 is a flow diagram illustrating one embodiment of a process for generating a composite transfer function.

FIG. 10 is a flow diagram illustrating one embodiment of a process 1000 for generating a CTF for discrete values. Process 700 for generating a printer transfer function and a print substrate transfer function has been previously described. Process 1000 may be performed by processing logic that may include hardware (e.g., circuitry, dedicated logic, programmable logic, microcode, etc.), software such as instructions run on a processing device, or a combination thereof. In one embodiment, process 1000 is performed by composite transfer function generation engine 920.

Process 1000 begins at processing block 1010 where digital count is initialized (e.g., DC=−1). At processing block 1020, the digital count is incremented (e.g., DC=DC+1). At processing block 1030, the value of print substrate transfer function 902 at the current digital count (substrateTF_i_j(DC)) is determined. In one embodiment, the discrete input values and output value are determined with a regression. A regression is generated using the print substrate transfer function data resulting in a regressed print substrate transfer function. The regressed print substrate transfer function has a technical benefit in that it may be used to determine all the needed print substrate transfer function output values for any corresponding input values. However, in other embodiments, an interpolation operation may be implemented instead for similar benefits. In one embodiment, substrateTF_i_j(DC) is determined as a floating point value.

At processing block 1040, printer transfer function 901 discrete output values (e.g., DC' values) are determined based on the output values from substrateTF_i_j, where input values of the printer transfer function are obtained from the output values from the print substrate TF. In one embodiment, the discrete input values and output value are determined with a regression. A regression is generated using the printer transfer function data resulting in a regressed printer transfer function. The regressed printer transfer function has a technical benefit in that it may be used to determine all the needed printer transfer function output values for any corresponding input values. However, in other embodiments an interpolation operation may be implemented instead for similar benefits. At processing block 1050, the output value of printer transfer function 1201 is rounded to values that achieve the CTF range (e.g., 0 input is mapped into 0 output and 255 input is mapped into (2^bitdepth)−1 output level). At processing block 1060, the output value and the corresponding digital count for this pass is stored for use in generating composite transfer function LUT 930.

At decision block 1070, a determination is made as to whether additional digital count values are to be processed in a subsequent pass. Control is returned to processing block 1020 upon a determination that additional digital count values are to be processed, where the digital count is incremented. In one embodiment, process 1000 continues until DC=255, generating a set of 256 DC' output values forming the composite transfer function as LUT 930. Composite transfer function LUT 930 may then be transmitted in processing block 1080 (e.g., to transfer function application module 235) for color imaging upon a determination at decision block 1070 that there are no additional digital count values. In one embodiment, CTFs within composite transfer function LUT 930 are used within a color imaging path of printing system 130 to transform CTI 904 (e.g., the contone image data) Digital Count (DC) values to generate modified contone levels DC' to be used by halftoning module 214.

Figure 11:
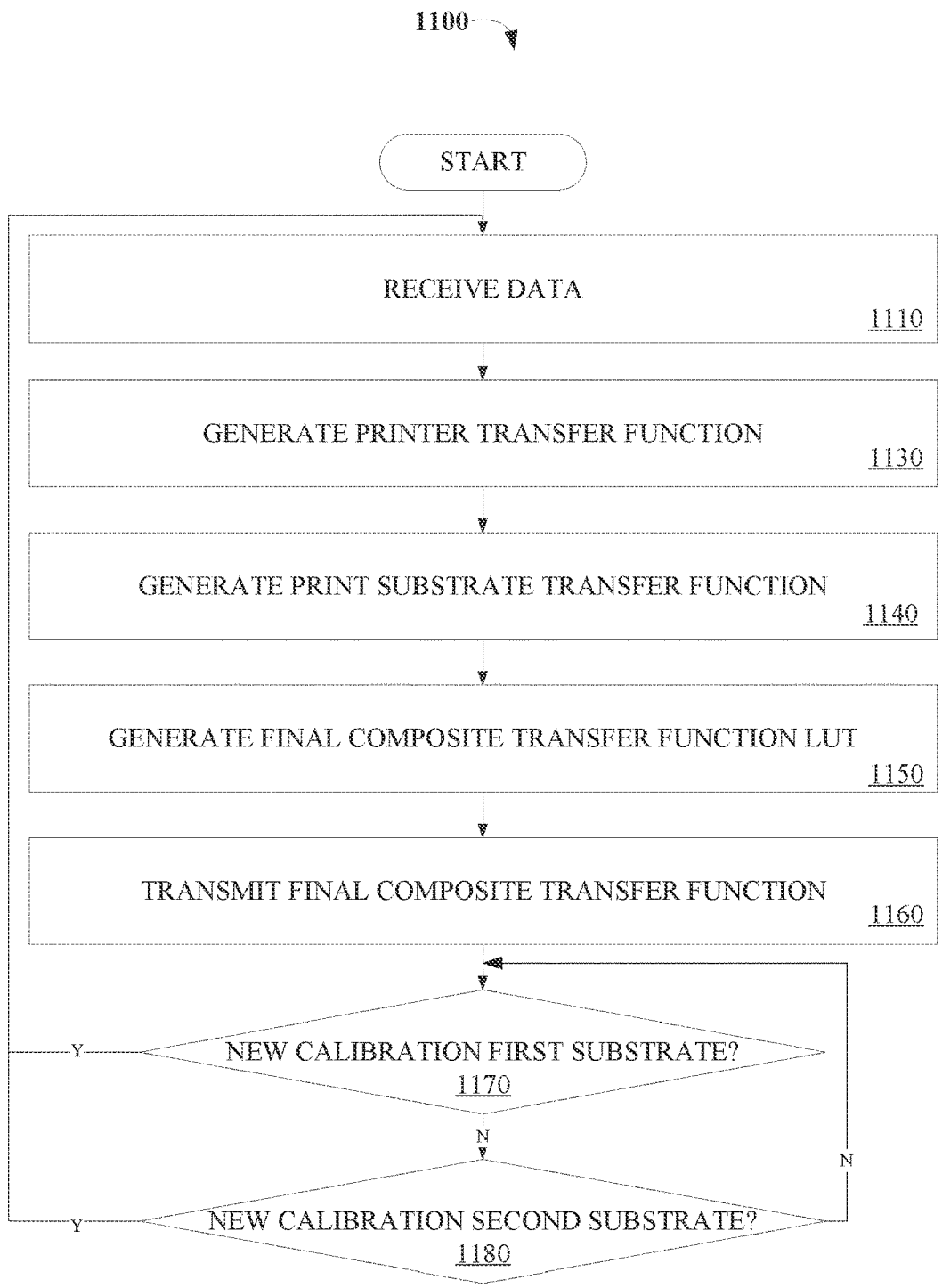
FIG. 11 is a flow diagram illustrating another embodiment of a calibration process.

FIG. 11 is a flow diagram illustrating another embodiment of a calibration process 1100. Process 700 for generating a printer transfer function and a print substrate transfer function has been previously described. Process 1100 may be performed by processing logic that may include hardware (e.g., circuitry, dedicated logic, programmable logic, microcode, etc.), software such as instructions run on a processing device, or a combination thereof. In one embodiment, process 1100 is performed by calibration engine 320.

Process 1100 begins at processing block 1110 where data is received. In one embodiment, a reference printer response target and first print measurement data (corresponding to the reference halftone design, the reference printer transfer function (e.g. identity TF)) from a first print substrate.

At processing block 1130, a printer transfer function (e.g., first printer transfer function) is generated for each digital count. Alternatively, a printer transfer function may be received in processing block 1130. At processing block 1140, a print substrate transfer function (e.g., a first print substrate transfer function for first print substrate is generated with the latest iteration of the reference printer transfer function evaluated at all digital count values. Alternatively, a print substrate transfer function may be received in processing block 1130.

At processing block 1150, a composite transfer function LUT 930 is generated based on the printer transfer function and the print substrate transfer function. At processing block 1160, the composite transfer function LUT 930, and/or printer transfer function and/or print substrate is transmitted. At decision block 1170, a determination is made as to whether a new (e.g., updated) calibration for the first print substrate (e.g., a request for a new calibration for the first print substrate) is received. If so, control is returned to processing block 1110, where updated data is received to repeat process 1110. Otherwise, a determination is made as to whether a request for a new print substrate calibration for a second print substrate (e.g., a request for a new calibration for a second print substrate) is received, decision 1180. Requests for calibration may be initiated by print controller 140 based on input received from a user interface in printing system 130 and/or the printer catalog data. Each composed LUT generated is associated with the print substrate that was used to generate the print substrate TF used with the composition. Control is again returned to processing block 1110 upon a determination that a request for a new calibration for a second print substrate is received. Otherwise, control is returned to decision block 1170 where a determination is again made as to whether a request for new calibration first print substrate is received.

As discussed above with reference to decision blocks 1170 and 1180, an updated composite transfer function may be generated each time a request for a new (e.g., updated) calibration print substrate is received.

Figure 12:
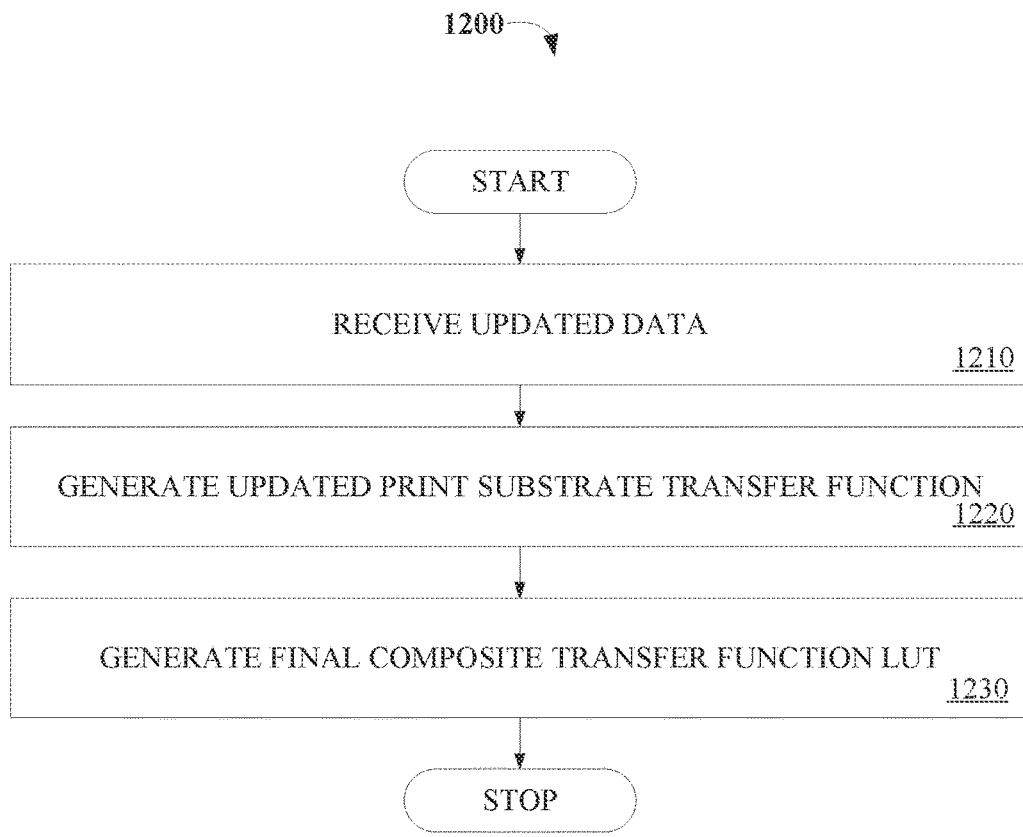
FIG. 12 illustrates one embodiment of a process for generating an updated composite transfer function.

FIG. 12 illustrates one embodiment of a process 1200 for generating an updated composite transfer function whenever updated print substrate data is received. Process 1200 may be performed by processing logic that may include hardware (e.g., circuitry, dedicated logic, programmable logic, microcode, etc.), software such as instructions run on a processing device, or a combination thereof. In one embodiment, process 1200 is performed by calibration engine 320.

At processing block 1210, updated print measurement data (corresponding to the reference printer transfer function from an updated or second print substrate) is received. At processing block 1220, an updated (or second) print substrate transfer function is generated based on the updated print measurement data. In an alternative embodiment, an updated (or second) print substrate transfer function may be received at processing block 1210, which would result in processing block 1220 being skipped. At processing block 1230, an updated (or second) composite transfer function LUT 930 is generated based on the current (or first) printer transfer function and the second print substrate transfer function.

A technical benefit of the composite transfer function is that when it is applied to a corresponding print system, it causes the print response to be calibrated and to achieve the second target response (e.g., the customer's desired target response) when printing on the second print substrate (e.g., the customer's paper) with the first halftone design. A corresponding print system is a print system that was the basis for the printer transfer function used to generate the composite transfer function.

Generating updated composite transfer functions provides technical benefits such as providing control input that may be used by print systems to achieve desired output response targets despite property changes in the print system and/or the print substrate.

Generating updated composite transfer functions corresponding to different print substrates (e.g., print substrates having different properties or print substrates having changed properties such as material, mass, thickness or surface treatments) provides technical benefits that include providing control input that may be used by print systems to achieve desired printer output response targets despite the print system switching printing between the different input print substrates. The generated transfer functions are available to be applied to the corresponding print system having the corresponding print substrates. An additional technical benefit of the composite transfer function is that generating an updated composite transfer function based on a different print substrate is performed using the current printer transfer function and avoids the processing step of generating or receiving an updated printer transfer function for the case where the print system response has not changed.

Generating updated composite transfer functions corresponding to print systems with print system response changes (e.g., print responses that have changes due to printhead wear or degradation, ink drop size variation, ink properties variation, etc.) provides technical benefits that include providing control input that may be used by print systems to achieve desired printer output response targets despite the print system response changes. The generated updated composite transfer functions are available to be applied to the corresponding print systems with corresponding print substrates. An additional technical benefit of the updated composite transfer function is that generating an updated composite transfer function based on a changed printer response is performed using the current print substrate transfer function and avoids the processing step of generating or receiving an updated print substrate transfer function for the case where the print substrate has not changed.

Figure 13:
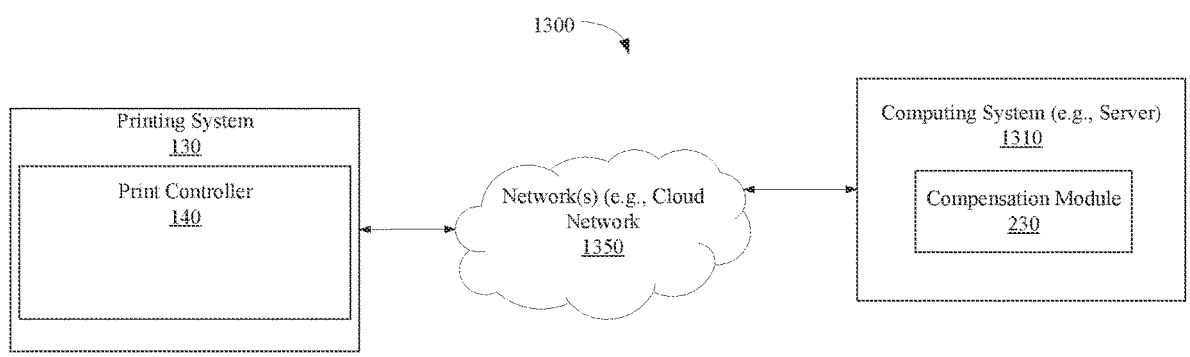
FIG. 13 illustrates one embodiment of a compensation module implemented in a network.

Although shown as a component of print controller 140, other embodiments may feature compensation module 230 included within an independent device communicably coupled to print controller 140. For instance, FIG. 13 illustrates one embodiment of compensation module 230 implemented in a network 1300. As shown in FIG. 13, compensation module 230 is included within a computing system 1310 and communicates with printing system 130 via a cloud network 1350.

Figure 14:
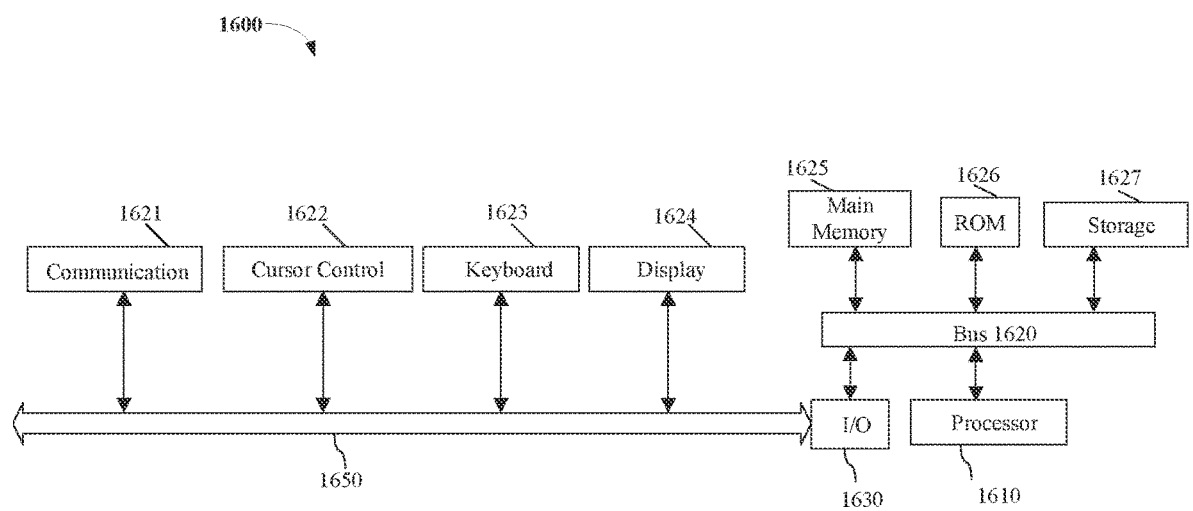
FIG. 14 illustrates one embodiment of a computer system.

FIG. 14 illustrates a computer system 1600 on which printing system 130, print controller 140 and compensation module 230 may be implemented. Computer system 1600 includes a system bus 1620 for communicating information, and a processor 1610 coupled to bus 1620 for processing information.

Computer system 1600 further comprises a random-access memory (RAM) or other dynamic storage device 1625 (referred to herein as main memory), coupled to bus 1620 for storing information and instructions to be executed by processor 1610. Main memory 1625 also may be used for storing temporary variables or other intermediate information during execution of instructions by processor 1610. Computer system 1600 also may include a read only memory (ROM) and or other static storage device 1626 coupled to bus 1620 for storing static information and instructions used by processor 1610.

A data storage device 1627 such as a magnetic disk or optical disc and its corresponding drive may also be coupled to computer system 1600 for storing information and instructions. Computer system 1600 can also be coupled to a second I/O bus 1650 via an I/O interface 1630. A plurality of I/O devices may be coupled to I/O bus 1650, including a display device 1624, an input device (e.g., an alphanumeric input device 1623 and or a cursor control device 1622). The communication device 1621 is for accessing other computers (servers or clients). The communication device 1621 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store calibration logic and one or more processors coupled with the at least one physical memory device to execute the calibration logic to receive a first printer transfer function, receive a first print substrate transfer function associated with a first print substrate and generate a composite transfer function based on a function composition operation of the first print substrate transfer function and the first printer transfer function.

Example 2 includes the subject matter of Example 1, wherein the composite transfer function is generated based on evaluating the function composition operation with input digital count values.

Example 3 includes the subject matter of Examples 1 and 2, wherein the composite transfer function comprises a lookup table.

Example 4 includes the subject matter of Examples 1-3, wherein generating the composite transfer function further comprises generating first printer transfer function output values for each of a plurality of digital count values where input values of the first printer transfer function are obtained from the output values of the first print substrate transfer function.

Example 5 includes the subject matter of Examples 1-4, wherein the first printer transfer function output values are determined based on a regression of discrete data values of the first printer transfer function.

Example 6 includes the subject matter of Examples 1-5, wherein generating the composite transfer function further comprises defining the first printer transfer function output range values to match halftone threshold array input domain values.

Example 7 includes the subject matter of Examples 1-6, wherein generating the composite transfer function includes applying the first print substrate transfer function as an inner function and applying the first printer transfer function as an outer function in the function composition operation.

Example 8 includes the subject matter of Examples 1-7, wherein the calibration logic receives a second print substrate transfer function associated with a second print substrate and generates a second composite transfer function based on the first printer transfer function and the second print substrate transfer function.

Example 9 includes the subject matter of Examples 1-8, wherein the physical memory device further to store transfer function application logic and the one or more processors execute the transfer function application logic to apply the composite transfer function to a received contone image data.

Example 10 includes the subject matter of Examples 1-9, further comprising one or more print engines.

Some embodiments pertain to Example 11 that includes at least one computer readable medium having instructions stored thereon, which when executed by one or more processors, cause the processors to receive a first printer transfer function, receive a first print substrate transfer function associated with a first print substrate and generate a composite transfer function based on a function composition operation of the first print substrate transfer function and the first printer transfer function.

Example 12 includes the subject matter of Example 11, wherein the composite transfer function is generated based on evaluating the function composition operation with input digital count values.

Example 13 includes the subject matter of Examples 11 and 12, wherein the composite transfer function comprises a lookup table.

Example 14 includes the subject matter of Examples 11-13, wherein generating the composite transfer function further comprises generating first printer transfer function output values for each of a plurality of digital count values where input values of the first printer transfer function are obtained from the output values of the first print substrate transfer function.

Example 15 includes the subject matter of Examples 11-14, wherein the first printer transfer function output values are determined based on a regression of discrete data values of the first printer transfer function.

Some embodiments pertain to Example 16 that includes a method comprising receiving a first printer transfer function, receiving a first print substrate transfer function associated with a first print substrate and generating a composite transfer function based on a function composition operation of the first print substrate transfer function and the first printer transfer function.

Example 17 includes the subject matter of Example 16, wherein the composite transfer function is generated based on evaluating the function composition operation with input digital count values.

Example 18 includes the subject matter of Examples 16 and 17, wherein the composite transfer function comprises a lookup table.

Example 19 includes the subject matter of Examples 16-18, wherein generating the composite transfer function further comprises generating first printer transfer function output values for each of a plurality of digital count values where input values of the first printer transfer function are obtained from the output values of the first print substrate transfer function.

Example 20 includes the subject matter of Examples 16-19, wherein the first printer transfer function output values are determined based on a regression of discrete data values of the first printer transfer function.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
at least one physical memory device to store calibration logic; and
one or more processors coupled with the at least one physical memory device to execute the calibration logic to:
receive a first printer transfer function;
receive a first print substrate transfer function associated with a first print substrate; and
generate a composite transfer function based on a function composition operation of the first print substrate transfer function and the first printer transfer function, wherein the function composition operation is evaluated with input digital count values.

2. The system of claim 1, wherein the evaluation of the composite transfer function generates output values.

3. The system of claim 1, wherein the composite transfer function comprises a lookup table.

4. The system of claim 1, wherein generating the composite transfer function further comprises generating first printer transfer function output values for each of a plurality of digital count values where input values of the first printer transfer function are obtained from the output values of the first print substrate transfer function.

5. The system of claim 4, wherein the first printer transfer function output values are determined based on a regression of discrete data values of the first printer transfer function.

6. The system of claim 4, wherein generating composite transfer function further comprises defining the first printer transfer function output range values to match halftone threshold array input domain values.

7. The system of claim 1, wherein generating the composite transfer function includes applying the first print substrate transfer function as an inner function and applying the first printer transfer function as an outer function in the function composition operation.

8. The system of claim 1, wherein the calibration logic receives a second print substrate transfer function associated with a second print substrate and generates a second composite transfer function based on the first printer transfer function and the second print substrate transfer function.

9. The system of claim 1, wherein the physical memory device further to store transfer function application logic and the one or more processors execute the transfer function application logic to apply the composite transfer function to a received contone image data.

10. The system of claim 1, further comprising one or more print engines.

11. At least one non-transitory computer readable medium having instructions stored thereon, which when executed by one or more processors, cause the processors to:
- receive a first printer transfer function;
- receive a first print substrate transfer function associated with a first print substrate; and
- generate a composite transfer function based on a function composition operation of the first print substrate transfer function and the first printer transfer function, wherein the function composition operation is evaluated with input digital count values.

12. The computer readable medium of claim 11, wherein the evaluation of the composite transfer function generates output values.

13. The computer readable medium of claim 11, wherein the composite transfer function comprises a lookup table.

14. The computer readable medium of claim 11, wherein generating the composite transfer function further comprises generating first printer transfer function output values for each of a plurality of digital count values where input values of the first printer transfer function are obtained from the output values of the first print substrate transfer function.

15. The computer readable medium of claim 14, wherein the first printer transfer function output values are determined based on a regression of discrete data values of the first printer transfer function.

16. A method comprising:
- receiving a first printer transfer function;
- receiving a first print substrate transfer function associated with a first print substrate; and
- generating a composite transfer function based on a function composition operation of the first print substrate transfer function and the first printer transfer function, wherein the function composition operation is evaluated with input digital count values.

17. The method of claim 16, wherein the evaluation of the composite transfer function generates output values.

18. The method of claim 16, wherein the composite transfer function comprises a lookup table.

19. The method of claim 16, wherein generating the composite transfer function further comprises generating first printer transfer function output values for each of a plurality of digital count values where input values of the first printer transfer function are obtained from the output values of the first print substrate transfer function.

20. The method of claim 19, wherein the first printer transfer function output values are determined based on a regression of discrete data values of the first printer transfer function.

* * * * *